United States Patent [19]

Nowak et al.

[11] 3,933,747

[45] Jan. 20, 1976

[54] REVERSIBLE CROSS-LINKING OF MALEIC ANHYDRIDE COPOLYMERS

[75] Inventors: Robert M. Nowak, Midland; Kenneth J. Guilette, Menominee; Eugene R. Moore, Midland, all of Mich.

[73] Assignee: The Dow Chemical Company, Midland, Mich.

[22] Filed: Apr. 2, 1971

[21] Appl. No.: 130,840

Related U.S. Application Data

[63] Continuation-in-part of Ser. No. 672,981, Oct. 5, 1967, abandoned.

[52] U.S. Cl...... 260/47 UP; 260/47 UA; 260/78.5 T
[51] Int. Cl.² ................. C08F 27/12; C08F 15/02
[58] Field of Search ................. 260/78.5 T, 47 UP

[56] References Cited

UNITED STATES PATENTS

| 3,299,184 | 1/1967 | Whitworth, Jr. | 260/897 |
| 3,336,259 | 8/1967 | Zimmerman | 260/47 |
| 3,408,337 | 10/1968 | Moore | 260/78.5 T |

*Primary Examiner*—Christopher A. Henderson, Jr.
*Attorney, Agent, or Firm*—Albin R. Lindstrom; H. Lyle Aamoth

[57] ABSTRACT

Copolymers containing from 5 to 25 mole percent of anhydride, such as maleic anhydride, have improved, thermally induced reversible cross-linking characteristics when the crosslinking agent is selected from certain hydroxyl containing derivatives of bisphenol A.

4 Claims, No Drawings

REVERSIBLE CROSS-LINKING OF MALEIC ANHYDRIDE COPOLYMERS

REFERENCES

This application is a continuation-in-part of U.S. application Ser. No. 672,981, filed on Oct. 5, 1967 and now abandoned.

BACKGROUND OF THE INVENTION

This invention relates to maleic anhydride copolymer compositions having improved thermally induced reversible cross-linking characteristics. More particularly the invention relates to copolymer compositions containing certain hydroxyl containing derivatives of 4,4'-isopropylidene diphenol (bisphenol A) as cross-linking agents.

The properties of many plastics are generally improved by cross-linking. Cross-linking may be readily accomplished by incorporating in a resin or polymer, a functional group such as hydroxyl, carboxyl, anhydride and the like which can be reacted to cross-link with a variety of di- or polyfunctional materials. However, such thermosetting products generally cannot be remelted and recast or reshaped into a hard cured article or product.

More recently it has been found that with polymers containing an anhydride group the cross-linking is thermally reversible. Such reversible cross-linking with styrene-maleic anhydride copolymers and the like is described in application Ser. No. 618,998 (now U.S. Pat. No. 3,678,016) filed Feb. 27, 1967 by R. L. Zimmerman et al. as a continuation-in-part of application Ser. No. 342,812 filed on Feb. 5, 1964 and now abandoned. Additionally, U.S. Pat. No. 3,299,184 discloses reversible cross-linking with certain anhydride containing polymers, although the patent points out maleic anhydride containing polymers are generally undesirable.

The utility of such compositions is dependent on the efficiency with which the cross-link bonds are formed, broken and reformed and particularly the efficiency over repetitive cycles of reversing the cross-links. Desirably this efficiency should be at the highest possible level to ensure reworkability and yet not sacrifice any of the properties of the cured cross-linked composition.

SUMMARY OF THE INVENTION

Accordingly, this invention provides for crosslinked compositions having improved properties and high efficiency in reversing the cross-links. The invention utilizes polymeric compositions containing anhydride functionality and more particularly utilizes copolymers of maleic anhydride. The improved efficiency in reversing the cross-linked polymeric compositions relates to the utility of certain hydroxyl containing derivatives of 4,4'-isopropylidene diphenol (bisphenol A) as the cross-linking agent.

DESCRIPTION OF THE INVENTION

A variety of vinyl polymers and resins may be used provided they contain anhydride functional groups. Polymers include those such as described in U.S. Pat. No. 3,299,184 and those copolymers prepared from α,β-unsaturated dicarboxylic acid anhydrides such as maleic anhydride, itaconic anhydride, citraconic anhydride and the like. The comonomers include many different polymerizable ethylenically unsaturated monomers such as vinyl aromatic monomers, olefinic monomers, vinyl ethers, vinyl acetate, vinyl halides, esters of acrylic or methacrylic acid and the like. Usually the copolymers are most readily available as copolymers of maleic anhydride with monomers such as styrene, alkylated or halogenated styrenes, α-methyl styrene and the like, or with the olefinic monomers such as ethylene, isobutylene, propylene and the like. Preferably the copolymer is a polymer of styrene and maleic anhydride.

The above polymers are readily prepared by standard polymerization methods both batch and continuous. A preferred method would utilize free radical generating catalysts to cause polymerization of the mixture of monomers. More important than the method by which the anhydride containing polymer is prepared is the anhydride content of the polymer. The polymer should contain from about 5 to about 25 mole percent of anhydride monomer with the balance consisting of any of the previously recited monomers or mixtures thereof.

The molecular weight of the anhydride containing polymer is important but less critical than the concentration of anhydride groups in the polymer. Generally, lower levels of cross-linking agent are required with higher molecular weight polymers, such as molecular weights of 100,000 or greater. However, lower molecular weights can be compensated for by increasing the level of cross-linking agent used.

The cross-linking agents preferred in this invention include the hydroxy alkyl diethers of 4,4'-isopropylidene diphenol (bisphenol A), hydrogenated bisphenol A and the corresponding hydroxy alkyl ethers of hydrogenated bisphenol A. By hydrogenated bisphenol A it is meant to include the compounds where one or both of the aromatic rings are completely hydrogenated. When only one ring is completely hydrogenated the compound may be referred to as half-hydrogenated bisphenol A, for example. The hydroxy alkyl ethers may be prepared in several different ways but are most readily prepared by reaction of an alkylene oxide with bisphenol A or hydrogenated bisphenol A. The preferred hydroxy alkyl ethers include the 2-hydroxy alkyl ethers wherein the alkyl group contains from 2 to 4 carbon atoms.

The cross-linking agents may also be illustrated by the formulas

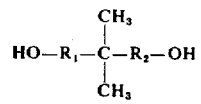

wherein $R_1$ is a cyclohexylene radical and $R_2$ may be the same as $R_1$ or a phenylene radical, and

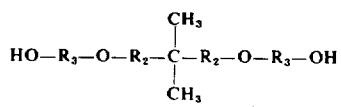

wherein $R_3$ is an alkylene radical of 2 to 4 carbon atoms and $R_2$ is as previously defined. The various isomers of said bisphenol A are contemplated within the scope of the cross-linking agents.

Reversibly cross-linked resin compositions are prepared by admixing the anhydride containing polymer with the cross-linking agent in such proportions to provide from about 0.05 to 0.5 moles of hydroxyl per mole of anhydride. Heating the composition up to about 150°C. cross-links the composition. Alternatively the composition may be heated to a temperature from about 175° to 300°C. wherein the composition is fluid and then cooled to form the cross-links. The cross-linked composition is hard, has good resistance to a range of solvents and to stress cracking and has a good range of other properties such as tensile, impact resistance, heat distortion, etc. Reversibility of cross-linking is accomplished by heating to a temperature from about 175° to 300°C. wherein the resin composition is fluidized and may be refabricated and shaped by cooling to reform the cross-links.

Generally, the cross-linking does not require the aid of a catalyst, but it has been found that the rate of formation of cross-links can be increased by the addition of mono- and dialkyl phosphoric acid catalysts wherein the alkyl group contains from about 5 to about 18 carbon atoms. Suitable catalysts include di-(2-ethylhexyl)phosphoric acid, a monoalkyl phosphoric acid wherein the alkyl group is predominantly $C_{17}$ and the like. The catalyst does not adversely affect the reversibilty of the cross-links upon heating. Generally from about 0.2 to about 2 percent by weight of the catalyst on the basis of resin solids is sufficient. The reversibility and the efficiency of reversibility is illustrated in the following nonlimiting examples.

EXAMPLE 1

A resin composition was formulated using a styrene-maleic anhydride polymer containing 15 percent maleic anhydride and having a viscosity of 4.5 cps (measured as a 10% by weight solution in methyl ethyl ketone at 25°C.) and a 2-hydroxyethyl diether of bisphenol A. The composition contained 0.15 moles of hydroxyl per mole of maleic anhydride and contained 0.25 percent by weight on the resin solids of di-(2-ethylhexyl)phosphoric acid as a catalyst.

Thermal cycling data was obtained by preparing a 10 × 10 × 0.04 inch specimen. The specimen was heated to 177°C. for 10 minutes and then quenched in an ice bath, then reheated for 10 minutes at 288°C. and quenched. This cycle was then repeated several times and after each quenching the gel content was determined. The % Gel was determined by placing a small (1 × 1 inch) weighed sample of the specimen in an 8 ounce bottle of toluene. After 24 hours any undissolved polymer was separated from the solvent, dried and weighed. The % Gel was calculated by dividing the dried weight by the initial weight and multiplying by 100. The % Gel is a measure of cross-linking, the higher the percentage the greater the number of cross-links. The results are recorded in Table I.

EXAMPLE 2

In a manner similar to that of Example 1, the 2-hydroxypropyl diether of bisphenol A and fully hydrogenated bisphenol A were evaluated as cross-linking agents for the polymer of Example 1. These results are recorded in Table I. Additionally, cured resin properties were determined and recorded in Table I. Similar results to those recorded were obtained with the half hydrogenated bisphenol A.

The data of Table I illustrate the efficiency of reversibility with the cross-linking agents of this invention and the properties of the cross-linked resin composition. For comparison 1,4-cyclohexane dimethanol (0.2 moles OH/mole anhydride) at the 177°C. temperature had a consistently high % Gel but at the reversibility temperature of 288°C. the composition still contained from 90–75% Gel.

EXAMPLE 3

To illustrate how the amount of cross-linker varies with the molecular weight of the resin, a series of experiments were made with styrene-maleic anhydride copolymers of different viscosity (molecular weight), each containing about 15 percent maleic anhydride. The crosslinking agent was the 2-hydroxyethyl diether of bisphenol A and the level of agent required for equivalent gel vs. temperature behavior is shown in Table II. Two additional samples with a 10% maleic anhydride resin are included.

TABLE II

| Polymer Viscosity* | % MA | Level of Cross-linker, wt. % |
|---|---|---|
| 4.5 | 10 | 4.7 |
| 4.5 | 15 | 3.5 |
| 7.4 | 10 | 2.0 |
| 8.0 | 15 | 1.5 |

*10% by wt. solution in methyl ethyl ketone (25°C.)

EXAMPLE 4

An equilibrium curve of % Gel vs. temperature can be obtained using the tests of Example 1 to illustrate the cross-linking characteristics. With a styrene-maleic anhydride resin containing 15% maleic anhydride (4.5 cps viscosity) an equilibrium curve was run with the half-hydrogenated bisphenol A as a cross-linker, without a catalyst and in the proportions of 0.5 moles OH/mole of anhydride.

At a temperature of about 177°C. (350°F.) the resin composition contained about 86% gel and at a reversibility temperature of about 260°C. (500°F.) the composition contains less than 5% gels. This curve indicates the above composition has excellent cross-linking characteristics giving over 80% gel at the lower (cross-link-

TABLE I

| Bisphenol A Cross-linking Agent | Moles OH per mole Anhydride | Thermal Cycling Data From Examples 1 and 2 % Gel | | | | | | Heat Distortion | Impact | Tensile p.s.i |
|---|---|---|---|---|---|---|---|---|---|---|
| | | Cycle 1 | | Cycle 2 | | Cycle 3 | | | | |
| | | 177°C. | 288°C. | 177°C. | 288°C. | 177°C. | 288°C. | | | |
| 2-hydroxyethyl diether | 0.15 | 93 | 3 | 96 | 7 | 99 | 22 | 121°C. | 0.29 | 4690 |
| 2-hydroxypropyl diether | 0.5 | 82 | 18 | 92 | 18 | 88 | 14 | 121 | 0.28 | 3340 |
| Fully Hydrogenated | 0.2 | 92 | 5 | 88 | 5 | 96 | 3 | 127 | 0.25 | 3250 | ing) temperature and becoming quite fluid at an elevated temperature.

Propylene glycol at a level of 0.2 moles of OH/mole of anhydride with the above resin and with 1.0% by weight of a catalyst shows good reversibility at about 280°C. but only shows about 72% gel at about 177°C. Further, the diol 2,2,4-trimethyl-1,3 pentanediol, shows good fluidity at about 280°C. but only about 40% gel at 177°C. at the level of 0.2 moles/mole of anhydride.

EXAMPLE 5

Similarly the level of cross-linker vs. anhydride content of the polymer was also evaluated using styrene-maleic anhydride copolymers of about the same molecular weight (approx. 5 cps). The same cross-linker was used as in Example 3.

TABLE III

| Percent Maleic Anhydride | Level of Cross-linker, wt. % |
|---|---|
| 3.0 | couldn't cross-link |
| 6.5 | 6.0 |
| 10.5 | 4.7 |
| 15.0 | 3.5 |
| 25.0 | 2.0 |

This invention provides for resin compositions which can be readily molded to produce articles having good physical properties and improved resistance to stress cracking and having good resistance to such solvents as acids, bases, alcohols, aldehydes, glycols, aliphatic hydrocarbons and amines and the like. The excellent reversible cross-linking characteristics of the resins also provides for ready refabrication similar to thermoplastics.

What is claimed is:

1. In a process for thermally reversing cross-links in a cross-linked composition by heating to about 175° to 300°C. and then cooling to reform a cross-linked composition wherein said composition comprises an intimate mixture of a vinyl interpolymer having reactive anhydride groups and a polyfunctional cross-linking agent, the improvement which comprises employing a cross-linking agent selected from the group consisting of hydrogenated 4,4'-isopropylidene diphenol, hydroxyalkyl diethers of 4,4'-isopropylidene diphenol and hydroxyalkyl diethers of hydrogenated 4,4'-isopropylidene diphenol wherein said hydroxyalkyl ether group in each case contains from 2 to 4 carbon atoms, employing a vinyl copolymer having from about 5 to 25 mole percent of an unsaturated dicarboxylic acid anhydride and employing a catalytic amount of a monoalkyl or a dialkyl phosphoric acid wherein the alkyl group contains from about 5 to 18 carbon atoms; said cross-linking agent present in an amount to provide about 0.05 to 0.5 moles of hydroxyl per mole of anhydride.

2. The process of claim 1 wherein said anhydride is maleic anhydride.

3. The process of claim 1 wherein said vinyl copolymer is a copolymer of styrene and maleic anhydride.

4. The process of claim 1 wherein the catalyst is di-(2-ethylhexyl)phosphoric acid.

* * * * *